(12) United States Patent
Duan et al.

(10) Patent No.: US 11,804,744 B2
(45) Date of Patent: Oct. 31, 2023

(54) AXIAL FLUX ELECTRIC MACHINE INCLUDING INSULATED HYBRID STATOR CORE WITH SOFT MAGNETIC COMPOSITE PORTIONS AND LAMINATED LAYERS

(71) Applicant: GM GLOBAL TECHNOLOGY OPERATIONS LLC, Detroit, MI (US)

(72) Inventors: Chengwu Duan, Shanghai (CN); Zhen Gao, Shanghai (CN); Jian Yao, Shanghai (CN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 17/714,252

(22) Filed: Apr. 6, 2022

(65) Prior Publication Data
US 2023/0291258 A1 Sep. 14, 2023

(30) Foreign Application Priority Data
Mar. 10, 2022 (CN) .......................... 202210231863.4

(51) Int. Cl.
*H02K 1/2798* (2022.01)
*H02K 1/16* (2006.01)
*H02K 21/24* (2006.01)
*H02K 3/30* (2006.01)
*H02K 16/02* (2006.01)
*H02K 1/18* (2006.01)

(52) U.S. Cl.
CPC .......... *H02K 1/2798* (2022.01); *H02K 1/165* (2013.01); *H02K 1/182* (2013.01); *H02K 3/30* (2013.01); *H02K 16/02* (2013.01); *H02K 21/24* (2013.01)

(58) Field of Classification Search
CPC ......... H02K 21/24; H02K 1/182; H02K 1/148
See application file for complete search history.

(56) References Cited

U.S. PATENT DOCUMENTS 6,265,804 B1 * 7/2001 Nitta ................. H02K 1/148
310/43
8,456,053 B2 * 6/2013 Kaiser ............... B60L 3/0061
310/201

(Continued)

FOREIGN PATENT DOCUMENTS

CN 109787389 B * 7/2021 ............... H02K 1/16
DE 102019000666 A1 8/2019
(Continued)

OTHER PUBLICATIONS

Office Action dated Dec. 20, 2022 from German Patent Office for German Patent Application No. 102022111253.5; 6 pages.

*Primary Examiner* — Quyen P Leung
*Assistant Examiner* — Masoud Vaziri

(57) ABSTRACT

An axial flux electric machine comprises a stator including a plurality of stator core segments each comprising a lamination comprising a plurality of layers. A first soft magnetic composite (SMC) portion is arranged adjacent to the plurality of layers of the lamination. An insulating layer arranged between circumferential side surfaces of the plurality of layers of the lamination and the first SMC portion. A rotor is arranged axially adjacent to the stator and including a plurality of permanent magnets. The rotor and stator are configured to generate magnetic flux that is aligned parallel to an axis of rotation of the rotor.

17 Claims, 5 Drawing Sheets

(56) References Cited

U.S. PATENT DOCUMENTS

| | | | | |
|---|---|---|---|---|
| 8,802,230 B2* | 8/2014 | Wang | ................ | H02K 3/30 |
| | | | | 428/389 |
| 2014/0209018 A1* | 7/2014 | Jin | ................ | H02K 15/02 |
| | | | | 427/104 |
| 2017/0155291 A1* | 6/2017 | Deàk | ................ | H02K 1/182 |
| 2019/0252930 A1* | 8/2019 | Stetina | ................ | H02K 3/522 |
| 2021/0351638 A1* | 11/2021 | Tang | ................ | H02K 1/02 |
| 2022/0045559 A1* | 2/2022 | Hunstable | ................ | H02K 21/24 |

FOREIGN PATENT DOCUMENTS

| | | | | |
|---|---|---|---|---|
| DE | 102020127447 A1 | 5/2021 | | |
| WO | WO-2021003509 A1 * | 1/2021 | ................ | H02K 1/02 |
| WO | WO-2021003510 A2 | 1/2021 | | |

\* cited by examiner

AXIAL FLUX ELECTRIC MACHINE INCLUDING INSULATED HYBRID STATOR CORE WITH SOFT MAGNETIC COMPOSITE PORTIONS AND LAMINATED LAYERS

CROSS-REFERENCE TO RELATED APPLICATIONS

This application claims the benefit of Chinese Patent Application No. 202210231863.4, filed on Mar. 10, 2022. The entire disclosure of the application referenced above is incorporated herein by reference.

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to axial flux electric machines, and more particularly to axial flux electric machines including an insulated hybrid stator core with soft magnetic composite portions and laminations.

Electric machines operate as motors to convert electrical energy into mechanical work by producing torque. Electric machines can also operate as generators to convert rotation energy to electrical energy. Electric vehicles (EVs), such as battery electric vehicles, fuel cell vehicles and hybrid vehicles, employ electric machines acting as a motor to propel the vehicle and acting as a generator to recapture energy during braking.

The electric machines include a rotor that rotates during operation and a stator that is stationary. The rotor includes a plurality of permanent magnets and rotates relative to the stator. The rotor is connected to a rotor shaft that rotates with the rotor. The rotor is separated from the stator by an air gap.

The stator includes windings. When power flows through the windings, magnetic fields are created. The magnetic fields bias the permanent magnets in the rotor and causing the rotor to rotate. In this manner, mechanical power can be transferred to the rotating rotor shaft. In an electric vehicle, the rotor transmits torque via the rotating shaft to the driven wheels of the vehicle.

Electric machines include radial flux electric machines and axial flux electric machines. In radial flux electric machines, the rotor and stator are typically situated in a concentric or nested configuration. When energized, the stator creates magnetic flux that extends in a radial direction from the stator to the rotor.

In axial flux electric machines, the rotor and stator are arranged side-by-side and are not nested. The magnetic flux extends parallel to an axis of rotation (parallel to the rotor shaft) between the rotor and stator. In certain applications, axial flux electric machines are desirable because they are relatively lightweight, generate increased power, and have a compact size as compared to radial flux electric machines.

SUMMARY

An axial flux electric machine comprises a stator including a plurality of stator core segments each comprising a lamination comprising a plurality of layers. A first soft magnetic composite (SMC) portion is arranged adjacent to the plurality of layers of the lamination. An insulating layer arranged between circumferential side surfaces of the plurality of layers of the lamination and the first SMC portion. A rotor is arranged axially adjacent to the stator and including a plurality of permanent magnets. The rotor and stator are configured to generate magnetic flux that is aligned parallel to an axis of rotation of the rotor.

In other features, the stator comprises a second SMC portion. The lamination is arranged between the first SMC portion and the second SMC portion. The first SMC portion includes a first inner stair-stepped surface and the second SMC portion includes a second inner stair-stepped surface. The first SMC portion includes a first outer angled surface and the second SMC portion includes a second outer angled surface. The first outer angled surface and the second outer angled surface define a trapezoidal shape of the plurality of stator core segments.

In other features, the plurality of layers of the lamination are arranged between the first inner stair-stepped surface of the first SMC portion and the second inner stair-stepped surface of the second SMC portion.

In other features, the insulation layer comprises insulation paper. The insulation layer comprises 3D printed insulation layer. The insulation layer comprises a coating. The insulation layer comprises an insulating adhesive.

In other features, the plurality of layers of the lamination comprise a plurality of sets. The plurality of sets have circumferential lengths that are different.

An axial flux electric machine includes a stator including a plurality of stator core segments each comprising a lamination comprising a plurality of layers; a first soft magnetic composite (SMC) portion arranged adjacent to the plurality of layers of the lamination. A second soft magnetic composite (SMC) portion is arranged adjacent to the plurality of layers of the lamination. The first SMC portion includes a first outer angled surface and the second SMC portion includes a second outer angled surface. The first outer angled surface and the second outer angled surface define a trapezoidal shape of the plurality of stator core segments. An insulating layer is arranged between circumferential side surfaces of the plurality of layers of the lamination and the first SMC portion and the second SMC portion. A rotor is arranged axially adjacent to the stator and including a plurality of permanent magnets. The rotor and stator are configured to generate magnetic flux that is aligned parallel to an axis of rotation of the rotor.

In other features, the first SMC portion includes a first inner surface and the second SMC portion includes a second inner surface that extends in a radial direction and is parallel to the first inner surface of the first SMC portion. The first SMC portion includes a first inner stair-stepped surface and the second SMC portion includes a second inner stair-stepped surface. The plurality of layers of the lamination are arranged between the first inner stair-stepped surface of the first SMC portion and the second inner stair-stepped surface of the second SMC portion.

In other features, the insulation layer comprises insulation paper. The insulation layer comprises 3D printed insulation layer. The insulation layer comprises a coating. The insulation layer comprises an insulating adhesive. The plurality of layers of the lamination comprise a plurality of sets layers, and wherein each of the plurality of sets of layers have circumferential lengths that are different.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

A stator of an axial flux electric machine typically includes a plurality of stator cores that are circumferentially arranged about a rotor shaft. Laminated stator cores may be difficult to manufacture into complex shapes, such as trapezoidal shapes, which improve the functionality of the stator. While stator cores made of soft magnetic composite (SMC) material can be formed into a variety of shapes, the stator cores can generate undesirable eddy currents and an increased level of hysteresis in an axial flux electric machine. SMC materials are formed by pressing powder such as iron powder and/or a mixture of powders and then heating.

An insulated hybrid stator core according to the present disclosure includes both laminations and SMC portions. The laminations typically form an interior portion of the insulated hybrid stator core, while the SMC portions form an exterior portion of the insulated hybrid stator core. An insulation layer is arranged between the laminations and the SMC portions.

The use of the SMC portions, laminations and the insulation layer ensures that the hybrid stator core does not generate undesirable eddy currents or an increased level of hysteresis. The presence of the SMC portions enables forming the hybrid stator core into a variety of complex shapes such as trapezoidal or other shapes. For example, the layers of the laminations may have the same length or are grouped into sets of layers having different circumferential lengths. In some examples, the SMC portions have stepped surfaces that abut circumferential edges of the laminations and angled outer surfaces that form angled sides of the trapezoidal shape. The trapezoidal shape of the SMC portions allow arrangement around the rotor shaft to form an annular disk.

Figure 1:
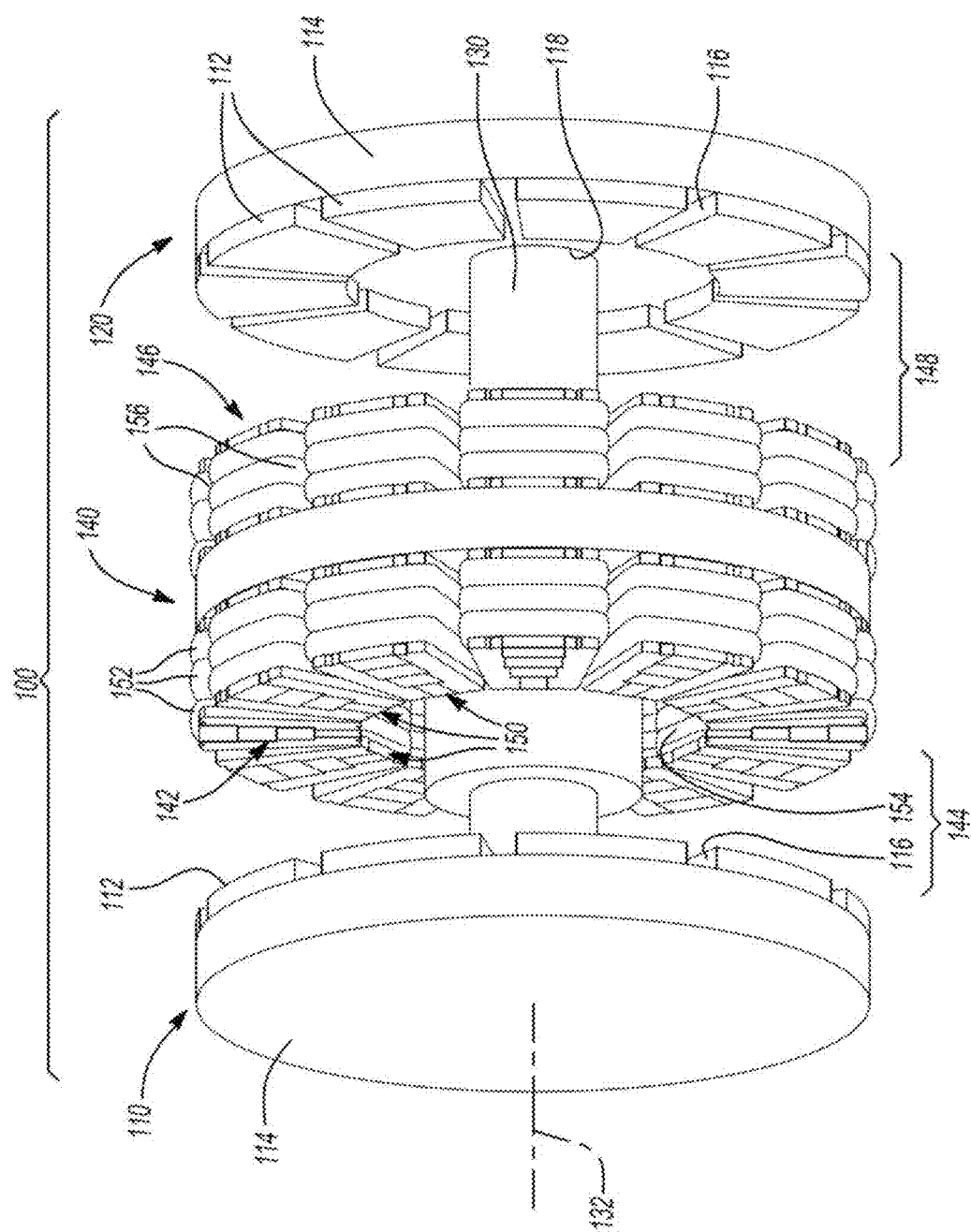
FIG. 1 is a perspective view of an example of an axial flux electric machine including a plurality of insulated hybrid stator cores according to the present disclosure.

A non-limiting example of an axial flux electric machine 100, also known as a pancake electric machine or motor, is shown in FIG. 1. The axial flux electric machine 100 includes a first rotor 110 and a second rotor 120 that are connected to and configured to rotate about a rotor shaft 130. While first and second rotors 110, 120 are shown, a single rotor can be used. Both the first and second rotors 110, 120 have an annular or disk shape with a centrally-disposed aperture 118. The rotor shaft 130 passes through the centrally-disposed aperture 118. The rotor shaft 130 defines a rotational axis 132 about which the rotor turns.

A stator 140 is disposed between the first rotor 110 and the second rotor 120 and has an annular or disk shape. The stator 140 is fixed and stationary, while the first and second rotors 110, 120 rotate during operation with the rotor shaft 130. The first rotor 110 faces a first side 142 of the stator 140 and defines a first air gap 144 therebetween. The second rotor 120 faces a second side 146 of the stator 140 and defines a second air gap 148 therebetween.

Though the axial flux electric machine 100 is shown to have a single central stator 140 and two external rotors 110, 120, other configurations are also contemplated. Other variations may include additional or fewer rotors and/or stators. Although not currently shown, the electric machine may further include a housing and the rotor(s) and stator may be disposed within the housing. The housing may be fixed to a vehicle frame and the shaft may be coupled to driven wheel(s).

Each of the first rotor 110 and the second rotor 120 can have the same design (facing in opposite directions towards the stator 140) and thus the common portions will be described herein. The first rotor 110 and second rotor 120 include a plurality of permanent magnets 112 affixed to a rotor body 114. The permanent magnets 112 are arranged with alternating polarity. Each permanent magnet 112 defines a channel 116 therebetween, which may extend radially along a face of the respective rotor. In this manner, the permanent magnets 112 and the channel 116 can together define a plurality of magnetic poles.

The stator 140 includes a plurality of insulated stator cores 150 about which a plurality of windings 152 are wrapped. The windings 152 may be made of copper, copper alloys or other suitable winding materials. The insulated stator cores 150 are circumferentially assembled to a stator disc on both the first and second sides 142 and 146 of the stator 140. The stator 140 defines a plurality of slots 156 between adjacent ones of the insulated stator cores 150, where the windings 152 may be wound in and through the slots 156. The stator 140 is stationary. Although not illustrated, other stator core and winding configurations and technologies as understood in the art are also contemplated. For example, the insulated stator cores 150 may be assembled to the stator disc on only one of the first and second sides 142 and 146 of the stator 140. In another example, the windings 152 may extend over or bridge the slots 156 instead of being wound in and through the slots 156.

The rotor shaft 130 may pass through a centrally disposed aperture 154 in the stator 140 and be supported by bearings that align the rotors 110, 120 with respect to the stator 140 while allowing rotation of the rotor shaft 130. The windings 152 of the stator 140 may be formed of copper wires or other conductive wires configured to generate a magnetic field when current is applied so as to interact with magnetic fields of the plurality permanent magnets 112 having alternating poles located on the first and second rotors 110, 120.

Different regions of the stator 140 may be selectively energized to impart a rotational force on the first and second rotors 110, 120 causing the rotors 110, 120 and the rotor shaft 130 to rotate with respect to the rotational axis 132. The axial flux electric machine 100 having the single stator 140 and the two rotors 110, 120 is capable of use in high torque applications, including electric vehicle or other non-vehicular applications. In such a variation, a housing encasing the axial flux electric machine 100 may be attached to the vehicle frame and at least one output from an end of the rotor shaft 130 is coupled to vehicle drive wheels. The vehicle application of the axial flux electric machine 100 is provided as an exemplary embodiment and is not intended to be limiting.

Figure 2B:
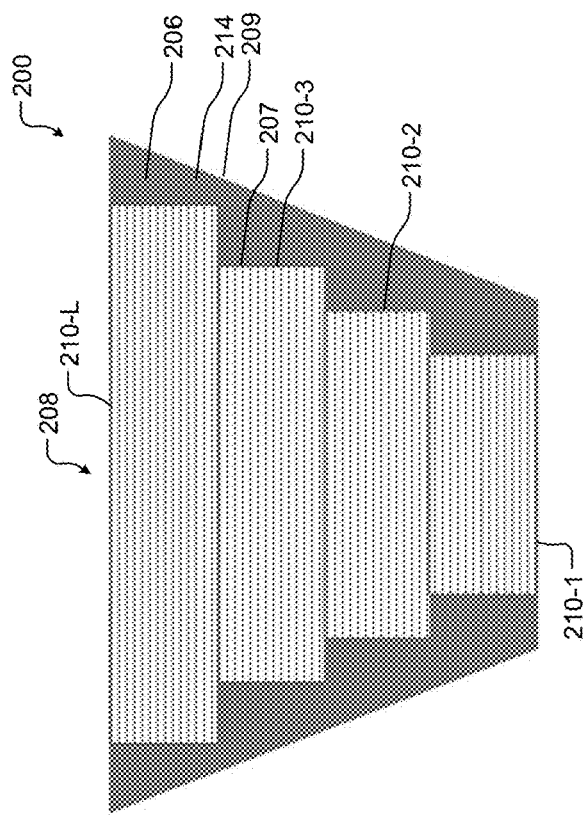
FIGS. 2A and 2B are plan views of examples of uninsulated hybrid stator cores.
Figure 2A:
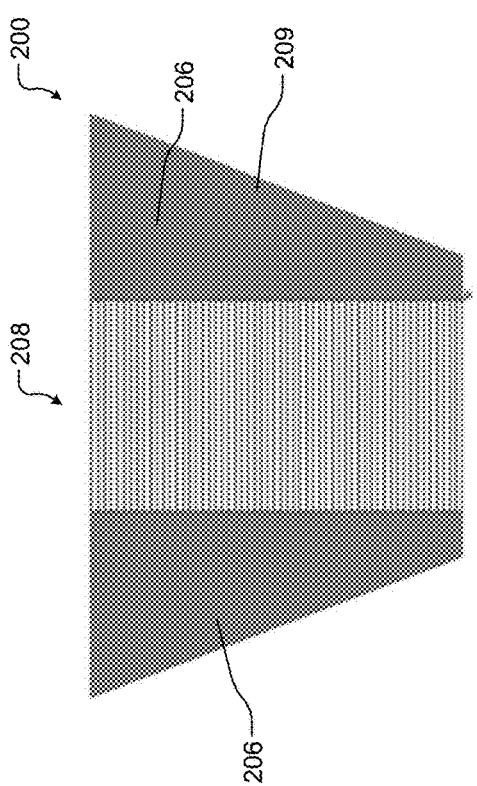

Referring now to FIGS. 2A and 2B, examples of uninsulated stator cores are shown. In FIG. 2A, an uninsulated stator core 200 includes SMC portions 206 and a lamination 208 including a plurality of layers. In FIG. 2A, the SMC portions 206 have inner surfaces 207 that extend parallel to one another in a radial direction (defining a rectangular inner area) and angled outer surfaces 209 to provide a trapezoidal shape. The layers of the lamination 208 have the same length and are arranged between the SMC portions 206.

In some examples, the layers of the lamination 208 are made of e-steel, although other materials can be used. In some examples, the layers of the lamination include steel and silicon. Adding silicon to steel increases the electrical resistance, improves the ability of magnetic fields to penetrate the layers, and reduces hysteresis loss. In some examples, the layers of the lamination 208 are isolated from one another by layers of an insulating material (not shown) interleaved therebetween.

In some examples, relatively high resistance is present between the layers of the lamination 208 (on the order of 1000's of Ohms (Ω)). Very low resistance is present within the layers of the lamination 208 (several milliohms (mΩ)). The SMC portion 206 has relatively low resistance (on the order of 10's of Ω). Poor insulation at the interface between the layers of the lamination 208 and the SMC portions 206 causes conduction between the layers of the lamination 208 through the SMC portions 206, which increases stator loss. Poor insulation also causes conduction between adjacent SMC portions 206 through the lamination 208, which also increases stator loss.

The layers of the lamination 208 can have the same circumferential length as shown in FIG. 2A or two or more different lengths as shown in FIG. 2B. In FIG. 2B, the SMC portions 206 have inner surfaces 207 that are stair-stepped and angled outer surfaces 209 to provide a trapezoidal shape. For example, the layers of the lamination 208 in FIG. 2B include sets of layers 210-1, 210-2, 210-3, . . . , and 210-L each including multiple layers. The sets of layers 210-1, 210-2, 210-3, . . . , and 210-L have first, second, third, . . . and Lth lengths in a circumferential direction, respectively. The sets of layers 210-1, 210-2, 210-3, . . . , and 210-L are arranged from shortest to longest length in an outward radial direction. There is no insulation between the SMC portions 206 and circumferential side surfaces of the layers of the lamination 208 in the uninsulated stator core 200.

Figure 3B:
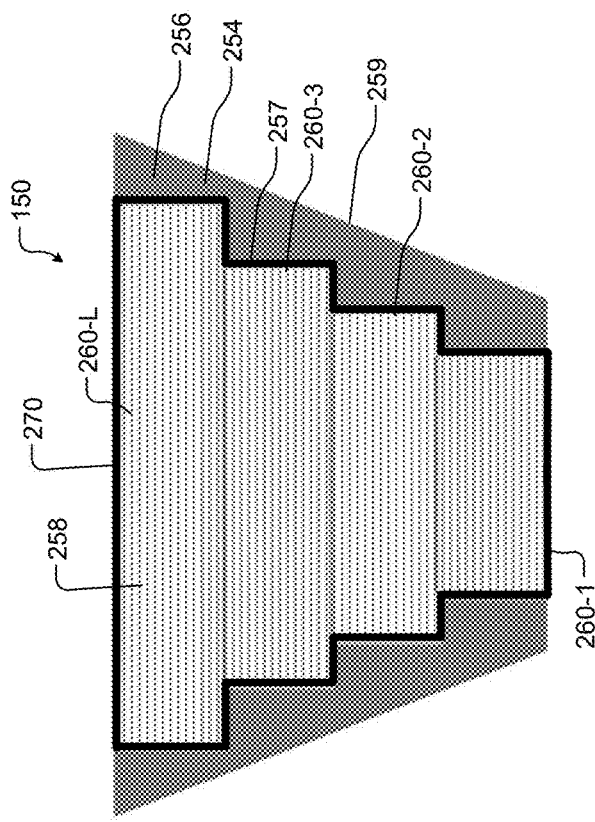
FIGS. 3A and 3B are plan views of examples of insulated hybrid stator cores with SMC portions, laminations and an insulation layer according to the present disclosure.
Figure 3A:
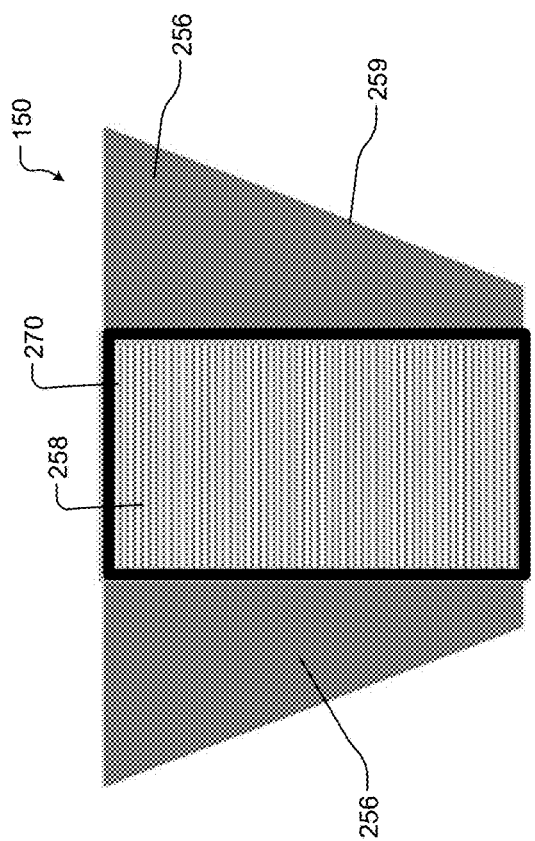

Referring now to FIGS. 3A and 3B, examples of the insulated stator cores 150 are shown. In FIG. 3A, the insulated stator cores 150 include SMC portions 256 and a lamination 258 including a plurality of layers. In some examples, the SMC portions 256 include inner surfaces extending parallel to one another in a radial direction (defining a rectangular inner area) and angled outer surfaces 259 to provide a trapezoidal shape. The lamination 258 have the same length and are arranged between the SMC portions 256.

The layers of the lamination 258 can have the same circumferential length as shown in FIG. 3A or two or more different lengths as shown in FIG. 3B. For example, the layers of the lamination 258 in FIG. 3B include sets of layers 260-1, 260-2, 260-3, . . . , and 260-L each including multiple layers. All of the layers in each of the sets of layers 210-1, 210-2, 210-3, . . . , and 210-L have the same length. However, the sets of layers 210-1, 210-2, 210-3, . . . , and 210-L have first, second, third, . . . and Lth lengths, respectively, in a circumferential direction. The sets of layers 210-1, 210-2, 210-3, . . . , and 210-L are arranged from shortest length to a longest length in an outward radial direction. In some examples, the lengths increase monotonically in the outward radial direction.

An insulation layer 270 is arranged between the SMC portions 256 and circumferential side surfaces of the layers of the lamination 258. In some examples, the insulation layer 270 comprises insulation paper. In some examples, the insulation layer is 3D printed. In other examples, the insulation layer 270 comprises an insulation coating or an insulating adhesive or glue.

Figure 4:
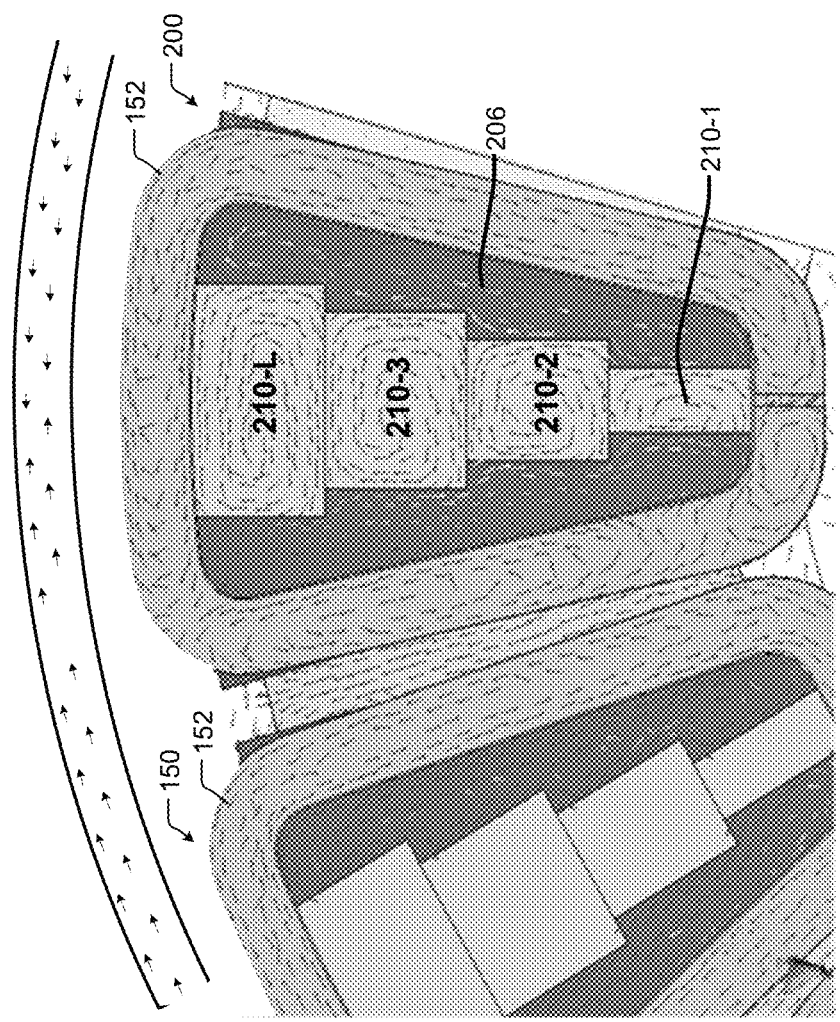
FIG. 4 is a simulation of current density for the uninsulated hybrid stator cores of FIG. 2B.
Figure 5:
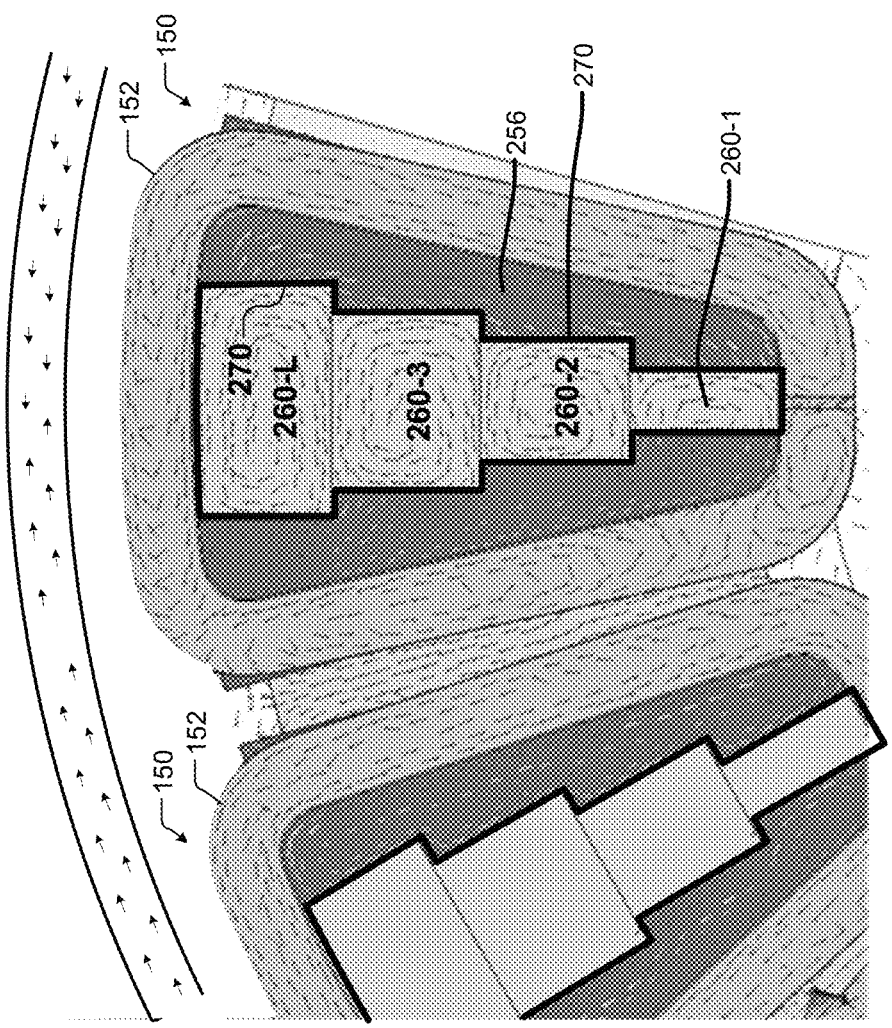
FIG. 5 is a simulation of current density for the insulated hybrid stator cores of FIG. 3B.

Referring now to FIGS. 4 and 5, simulation of current density in the uninsulated stator cores 200 and the insulated stator cores 150 from FIGS. 2B and 3B, respectively, are shown. In FIG. 4, the uninsulated stator core 200 of FIG. 2B does not include the insulation layer. The layers of the lamination 208 conduct from left to right and a global eddy current with strong current density is formed within the SMC portions 206, which increases stator core loss.

In FIG. 5, the insulated stator core segments 150 include the insulation layer 270. The layers of the lamination 258 conduct current from left to right and a local eddy current with relatively low current density is formed within the SMC portions 206. Adding the insulation layer 270 around the layers of the lamination 258 reduces loss with the stator cores 150. While the loss in the lamination 258 remains about the same, the loss in the SMC portions 256 for the insulated stator cores 150 is significantly reduced. In some examples, the loss in the SMC portions 256 for the insulated stator cores 150 is reduced by over 80% and the combined loss for the insulated stator cores (the lamination 258 and the SMC portions 256) is reduced by about 25%.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements.

Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments. As used herein, the phrase at least one of A, B, and C should be construed to mean a logical (A OR B OR C), using a non-exclusive logical OR, and should not be construed to mean "at least one of A, at least one of B, and at least one of C."

What is claimed is:

1. An axial flux electric machine, comprising
a stator including a plurality of stator core segments each comprising:
   a lamination comprising a plurality of layers;
   a first soft magnetic composite (SMC) portion arranged adjacent to the plurality of layers of the lamination; and
   an insulating layer arranged between circumferential side surfaces of the plurality of layers of the lamination and the first SMC portion, the insulating layer surrounding the plurality of layers of the lamination; and
a rotor arranged axially adjacent to the stator and including a plurality of permanent magnets,
wherein the rotor and stator are configured to generate magnetic flux that is aligned parallel to an axis of rotation of the rotor, and
wherein the stator comprises a second SMC portion separate from the first SMC portion, the first SMC portion includes a first inner stair-stepped surface having at least four parallel inner surfaces and the second SMC portion includes a second inner stair-stepped surface having at least four parallel inner surfaces, and the insulating layer comprises an insulative coating defining a stair-stepped pattern along the first inner stair-stepped surface and the second inner stair-stepped surface.

2. The axial flux electric machine of claim 1, wherein the lamination is arranged between the first SMC portion and the second SMC portion.

3. The axial flux electric machine of claim 2, wherein the first SMC portion includes a first outer angled surface and the second SMC portion includes a second outer angled surface, and wherein the first outer angled surface and the second outer angled surface define a trapezoidal shape of the plurality of stator core segments.

4. The axial flux electric machine of claim 2, wherein the plurality of layers of the lamination are arranged between the first inner stair-stepped surface of the first SMC portion and the second inner stair-stepped surface of the second SMC portion.

5. The axial flux electric machine of claim 1, wherein the insulation layer comprises insulation paper.

6. The axial flux electric machine of claim 1, wherein the insulation layer comprises 3D printed insulation layer.

7. The axial flux electric machine of claim 1, wherein the insulation layer comprises an insulating adhesive.

8. The axial flux electric machine of claim 1, wherein the plurality of layers of the lamination comprise a plurality of sets, and wherein the plurality of sets have circumferential lengths that are different.

9. An axial flux electric machine, comprising
a stator including a plurality of stator core segments each comprising:
   a lamination comprising a plurality of layers;
   a first soft magnetic composite (SMC) portion arranged adjacent to the plurality of layers of the lamination;
   a second soft magnetic composite (SMC) portion arranged adjacent to the plurality of layers of the lamination,
   wherein the first SMC portion includes a first outer angled surface and the second SMC portion includes a second outer angled surface, and
   wherein the first outer angled surface and the second outer angled surface define a trapezoidal shape of the plurality of stator core segments; and
   an insulating layer arranged between circumferential side surfaces of the plurality of layers of the lamination and the first SMC portion and the second SMC portion, the insulating layer surrounding the plurality of layers of the lamination; and
a rotor arranged axially adjacent to the stator and including a plurality of permanent magnets,
wherein the rotor and stator are configured to generate magnetic flux that is aligned parallel to an axis of rotation of the rotor, and
wherein a resistance between the plurality of layers of the lamination is at least 1000 ohms, and a resistance of the first SMC portion and the second SMC portion is less than 100 ohms.

10. The axial flux electric machine of claim 9, wherein the first SMC portion includes a first inner surface and the second SMC portion includes a second inner surface that extends in a radial direction and is parallel to the first inner surface of the first SMC portion.

11. The axial flux electric machine of claim 9, wherein the first SMC portion includes a first inner stair-stepped surface and the second SMC portion includes a second inner stair-stepped surface.

12. The axial flux electric machine of claim 11, wherein the plurality of layers of the lamination are arranged between the first inner stair-stepped surface of the first SMC portion and the second inner stair-stepped surface of the second SMC portion.

13. The axial flux electric machine of claim 9, wherein the insulation layer comprises insulation paper.

14. The axial flux electric machine of claim 9, wherein the insulation layer comprises 3D printed insulation layer.

15. The axial flux electric machine of claim 9, wherein the insulation layer comprises a coating.

16. The axial flux electric machine of claim 9, wherein the insulation layer comprises an insulating adhesive.

17. The axial flux electric machine of claim 9, wherein the plurality of layers of the lamination comprise a plurality of sets layers, and wherein each of the plurality of sets of layers have circumferential lengths that are different.

* * * * *